(12) United States Patent
Choi et al.

(10) Patent No.: US 10,919,406 B2
(45) Date of Patent: Feb. 16, 2021

(54) POWER CHARGING/SELLING DEVICE AND METHOD

(71) Applicant: DOOSAN HEAVY INDUSTRIES & CONSTRUCTION CO., LTD., Changwon-si (KR)

(72) Inventors: Jong Min Choi, Yongin-si (KR); Seong Yeol Yang, Yongin-si (KR); Seung Chul Lee, Seoul (KR)

(73) Assignee: Doosan Heavy Industries Construction Co., Ltd, Gyeongsangnam-do (KR)

(*) Notice: Subject to any disclaimer, the term of this patent is extended or adjusted under 35 U.S.C. 154(b) by 208 days.

(21) Appl. No.: 16/120,349

(22) Filed: Sep. 3, 2018

(65) Prior Publication Data
US 2019/0152327 A1 May 23, 2019

(30) Foreign Application Priority Data
Nov. 23, 2017 (KR) .................. 10-2017-0157493

(51) Int. Cl.
*G06Q 30/02* (2012.01)
*B60L 53/66* (2019.01)
(Continued)

(52) U.S. Cl.
CPC ............ *B60L 53/665* (2019.02); *B60L 53/14* (2019.02); *B60L 53/305* (2019.02); *B60L 53/64* (2019.02);
(Continued)

(58) Field of Classification Search
CPC ..................... G06Q 30/02; B60L 53/665
See application file for complete search history.

(56) References Cited

U.S. PATENT DOCUMENTS

2012/0095830 A1* 4/2012 Contreras Delpiano .................. G06Q 30/06 705/14.49
2012/0316691 A1* 12/2012 Boardman .......... H02J 13/0079 700/293
(Continued)

FOREIGN PATENT DOCUMENTS

CN 104504812 A 4/2015
CN 204597583 U 8/2015
(Continued)

OTHER PUBLICATIONS

Qinghua Zhang; Dongmei Shi; Guquan Cheng; Zhuan Wang; Jiaqin Sun; Yi Wang, Research on vehicle-t-X electricity trading rules(English), 2014 9th IEEE Conference on Indusrrial Electronics and Applications (pp. 2105-2109), Jun. 1, 2014 (Year: 2014).*
(Continued)

*Primary Examiner* — Marilyn G Macasiano
(74) *Attorney, Agent, or Firm* — INVENSTONE Patent, LLC

(57) ABSTRACT

A power charging and selling device includes first and second connection units configured to be connected to an electric vehicle and at least one power supplier server, respectively; a control unit for receiving a unique identifier and battery information of the electric vehicle through the first connection unit and for receiving power-trading charge information provided from each power supplier server through the second connection unit; and a guide unit for advertising the received power-trading charge information and for enabling selection of a corresponding power supplier. Through the first connection unit, the control unit may charge the electric vehicle with the power of a selected power supplier or sell the power stored in the electric vehicle to a selected power supplier. The power charging/selling device receives charge information from power suppliers,
(Continued)

and a user selects the charging/selling scheme accordingly, even if the power source of the electric vehicle is turned off.

15 Claims, 4 Drawing Sheets

(51) Int. Cl.
```
H02J 7/00      (2006.01)
G06Q 50/06     (2012.01)
G06Q 40/04     (2012.01)
B60L 53/14     (2019.01)
G07F 15/00     (2006.01)
B60L 53/65     (2019.01)
G06Q 20/14     (2012.01)
B60L 53/30     (2019.01)
B60L 53/64     (2019.01)
B60L 55/00     (2019.01)
H04L 29/08     (2006.01)
```
(52) U.S. Cl.
CPC .............. *B60L 53/65* (2019.02); *B60L 53/66* (2019.02); *B60L 55/00* (2019.02); *G06Q 20/145* (2013.01); *G06Q 30/0277* (2013.01); *G06Q 40/04* (2013.01); *G06Q 50/06* (2013.01); *G07F 15/005* (2013.01); *G07F 15/008* (2013.01); *H02J 7/0047* (2013.01); *H02J 7/0048* (2020.01); *H04L 67/12* (2013.01)

(56) References Cited

U.S. PATENT DOCUMENTS

| | | | |
|---|---|---|---|
| 2015/0042286 A1* | 2/2015 | Lu | B60L 55/00 320/128 |
| 2016/0031339 A1* | 2/2016 | Geo | B60L 53/16 320/109 |
| 2019/0280509 A1* | 9/2019 | Yokoyama | B60L 50/50 |

FOREIGN PATENT DOCUMENTS

| | | |
|---|---|---|
| DE | 102012215813 A1 | 3/2014 |
| JP | 2013-518356 A | 5/2013 |
| JP | 2013192025 A | 9/2013 |
| KR | 2004-0053165 A | 6/2004 |
| KR | 10-2010-0079338 A | 7/2010 |
| KR | 10-2010-0125169 A | 11/2010 |
| KR | 10-2011-0057557 A | 6/2011 |
| KR | 10-2012-0072192 A | 7/2012 |
| KR | 10-2016-0000157 A | 1/2016 |
| WO | 2013-062453 A1 | 5/2013 |

OTHER PUBLICATIONS

H. Chaudhry; T. Bohn, A V2G application using DC fast charging and its impact on the grid (English), 2012 IEEE Transportation Electrification Conference and Expo (ITEC) (pp. 1-6), Aug. 10, 2012 (Year: 2012).*

Shihui Tian; Guowei Hua, Charging and discharging strategies for electric vehicles based on V2G (English), 2015 International Conference on Logistics, informatics and Service Sciences (LISS) (pp. 1-5) Jul. 1, 2015 (Year: 2015).*

An European Search Report dated Apr. 15, 2019 in connection with European Patent Application No. 18203198.9 which corresponds to the above-referenced U.S. application.

A Korean Office Action dated Aug. 29, 2019 in connection with Korean Patent Application No. 10-2017-0157493 which corresponds to the above-referenced U.S. application.

A Japanese Office Action dated Oct. 8, 2019 in connection with Japanese Patent Application No. 2018-155814 which corresponds to the above-referenced U.S. application.

A Korean Office Action dated Feb. 18, 2019 in connection with Korean Patent Application No. 10-2017-0157493 which corresponds to the above-referenced U.S. application.

* cited by examiner

【FIG. 1】
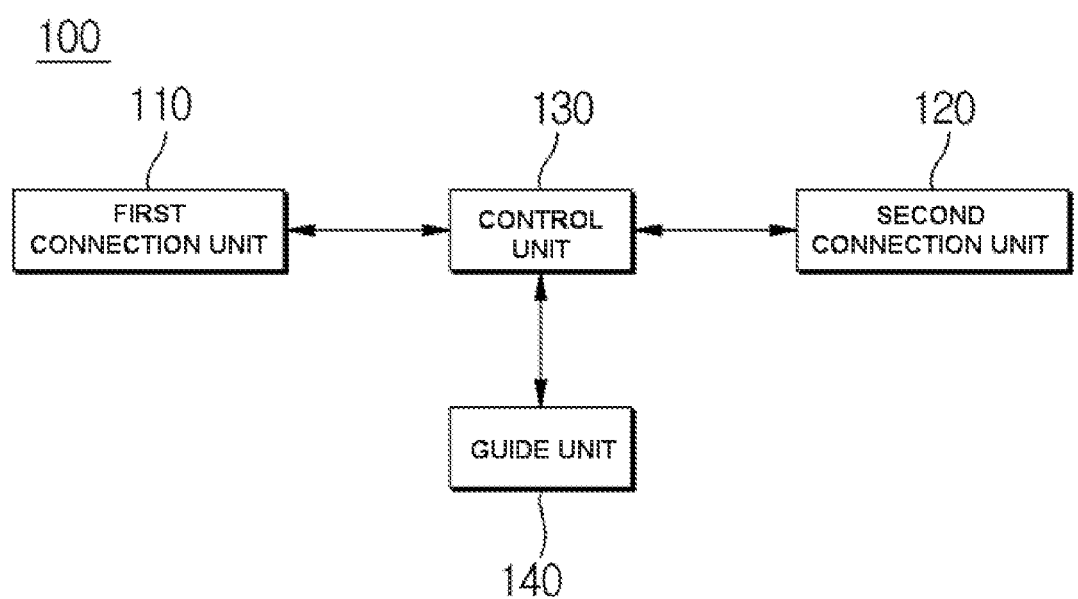

[FIG. 2]
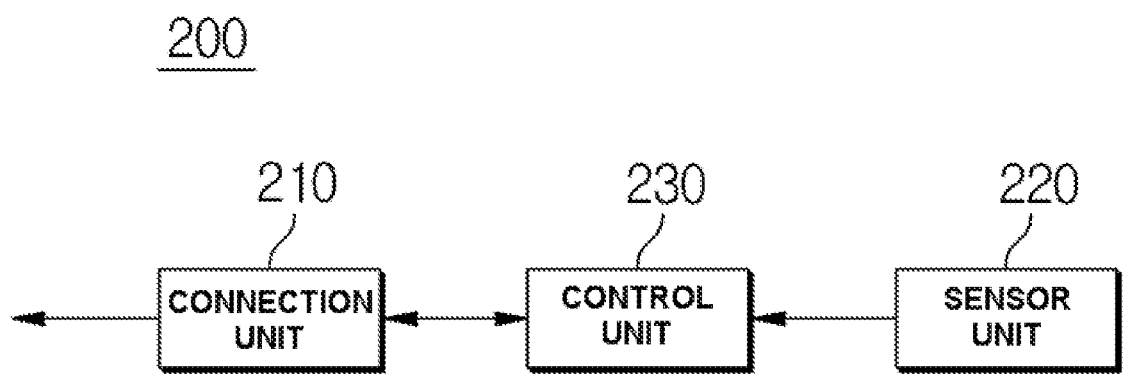

【FIG. 3】
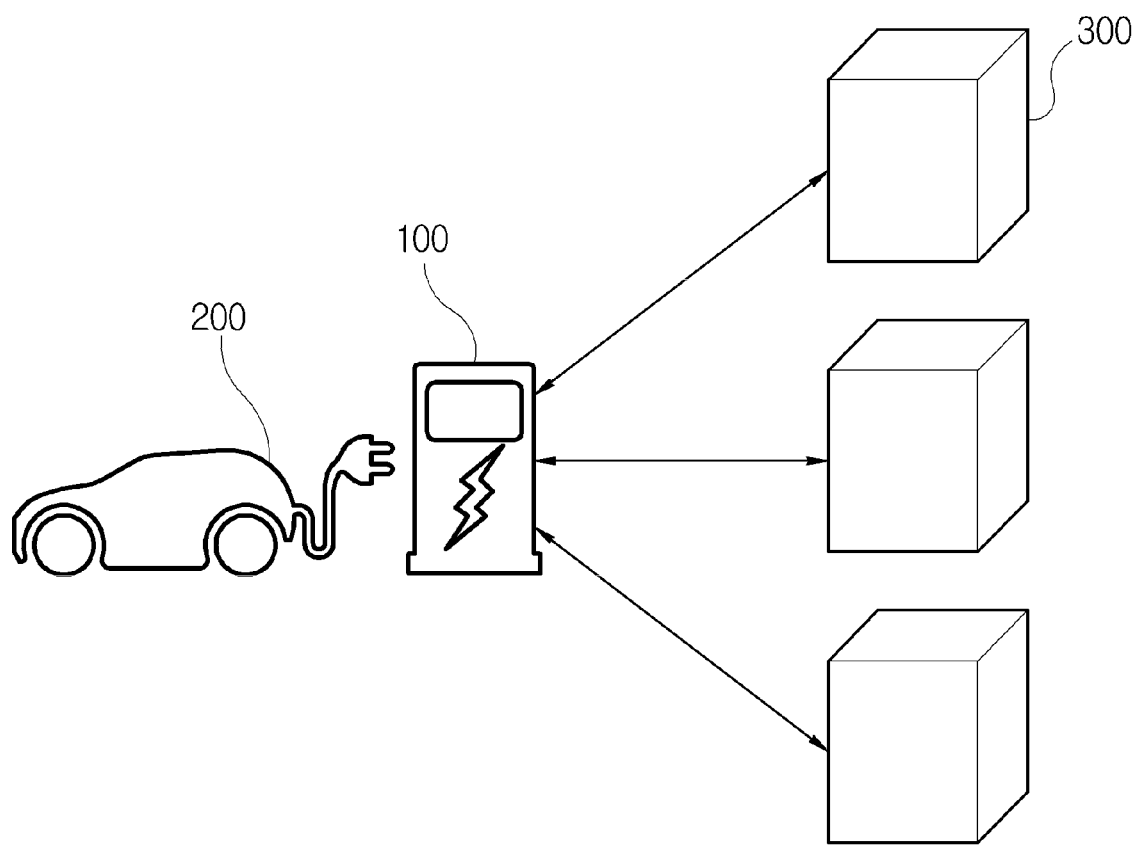

[FIG. 4]
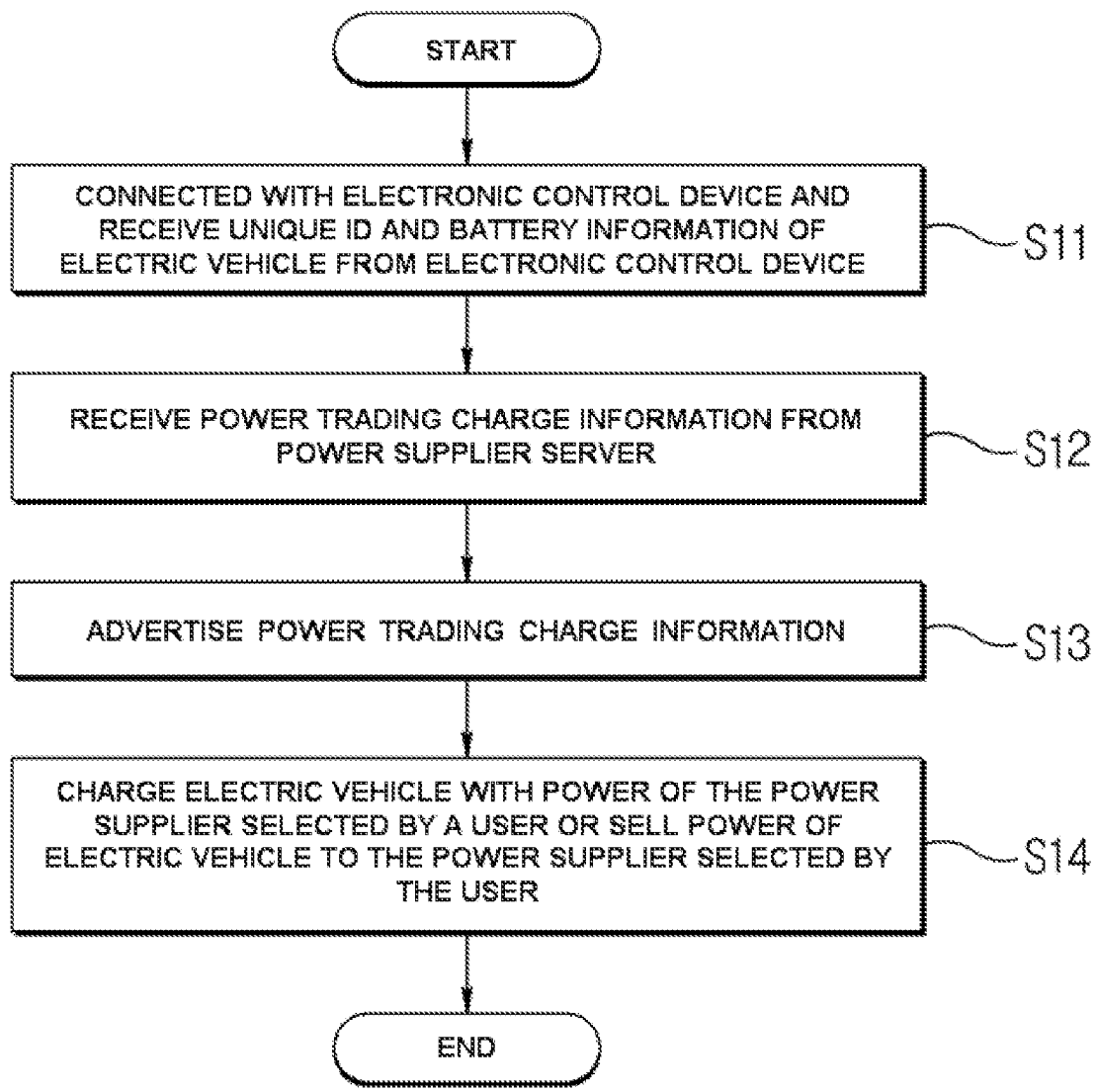

POWER CHARGING/SELLING DEVICE AND METHOD

CROSS-REFERENCE TO RELATED APPLICATIONS

This application claims priority to Korean Patent Application No. 10-2017-0157493, filed on Nov. 23, 2017, the disclosure of which is incorporated herein by reference in its entirety.

BACKGROUND OF THE DISCLOSURE

Field of the Disclosure

The present disclosure relates to a power charging/selling device and method, and more particularly, to a power charging/selling device and method, which advertises power charge information provided by a plurality of power suppliers that supply power when an electric vehicle connects with a charging station, and charges the power of the electric vehicle with the power of the selected power supplier or sells the power to the selected power supplier.

Description of the Related Art

A grid-to-vehicle (G2V) charging operation, for charging of an electric vehicle connected to a grid, is time-consuming. Moreover, there are few charging stations established to date, making them difficult to locate and in turn making the charge information of a given charging station difficult to ascertain. Thus, the process of charging the electric vehicle is cumbersome.

In addition, reselling the charged power at the power peak time, using a vehicle-to-grid (V2G) process, is effective in adjusting the power load rate, but there is a difficulty in activation because the process of reselling the remaining charges of the electric vehicle is troublesome to the driver.

Further, there is a problem that when the driver charges the electric vehicle at the charging station, the charging charge information is not obtained and the selling charge information for reselling the power of the electric vehicle is not provided at all.

SUMMARY OF THE DISCLOSURE

The present disclosure is intended to solve the problems, and an object of the present disclosure is to provide a power charging/selling device and method for receiving charge information provided from a plurality of power suppliers to allow a user to select the power charging charge and/or selling charge of the electric vehicle.

In addition, another object of the present disclosure is to provide a power charging/selling device and method for receiving charge information through a charging station to charge an electric vehicle by selecting a charging charge even when the power source of the electric vehicle is turned off.

Other than the above-described objects of the present disclosure, other features and advantages of the present disclosure will be described hereinafter, or can be clearly understood by those skilled in the art to which the present disclosure pertains from the technology and description thereof.

A power charging/selling device in accordance with an embodiment of the present disclosure for achieving the above-described objects includes a device for charging an electric vehicle with power and for selling power stored in the electric vehicle. The device may include a first connection unit configured to be connected to the electric vehicle; a second connection unit configured to be connected to at least one power supplier server; a control unit for receiving a unique identifier and battery information of the electric vehicle through the first connection unit and for receiving power-trading charge information provided from each of the at least one power supplier server through the second connection unit; and a guide unit for advertising the received power-trading charge information and for enabling selection of a power supplier corresponding to one of the at least one power supplier server, wherein the control unit is configured to charge, through the first connection unit, the electric vehicle with the power of a selected power supplier, and to sell, through the first connection unit, the power stored in the electric vehicle to a selected power supplier.

An electronic control device in accordance with an embodiment of the present disclosure for achieving the above-described objects includes an electronic control device for interlocking with a device that charges an electric vehicle with power and sells power stored in the electric vehicle and for managing a battery of the electric vehicle. The electronic control device may include a connection unit configured to be connected to the power charging and selling device; a sensor unit for outputting a measurement signal indicative of a state of the battery; and a control unit for generating state information of the battery based on the outputted measurement signal, controlling power discharging of the battery for charging and/or selling the power of the battery, and transmitting/receiving a control signal by interlocking with the power charging/selling device through the connection unit.

A power charging/selling system in accordance with an embodiment of the present disclosure for achieving the above-described objects includes a system for charging an electric vehicle with power and for selling power stored in the electric vehicle. The system may include a power charging and selling device; an electronic control device for interlocking with the power charging and selling device and for managing a battery of the electric vehicle, the electronic control device configured to transmit a unique identifier and battery information of the electric vehicle to the power charging and selling device; and at least one power supplier server configured to transmit power-trading charge information corresponding to each of the at least one power supplier server, wherein the power charging and selling device is configured to advertise the transmitted power-trading charge information, to enable selection of a power supplier corresponding to one of the at least one power supplier server; to charge the electric vehicle with the power of a selected power supplier; and to sell the power stored in the electric vehicle to a selected power supplier.

Meanwhile, a power charging/selling method in accordance with an embodiment of the present disclosure for achieving the above-described objects includes a method of using a power charging and selling device to charge an electric vehicle with power and to sell power stored in the electric vehicle. The method may include connecting an electronic control device provided in the electric vehicle to the power charging and selling device, to receive a unique identifier and battery information of the electric vehicle from the electronic control device; receiving power-trading charge information from each of at least one power supplier server; advertising the received power-trading charge information, to enable selection of a power supplier corresponding to one of the at least one power supplier server; and performing one of charging the electric vehicle with the power of a selected power supplier and selling the power stored in the electric vehicle to a selected power supplier.

The power charging/selling device and method in accordance with the embodiment of the present disclosure can receive the charge information provided from the plurality of power suppliers so that the user selects the power charging charge and/or selling charge of the electric vehicle.

In addition, it is possible to receive the charge information through the charging station so that the electric vehicle is charged by selecting the charging charge even when the power source of the electric vehicle is turned off.

In addition, other features and advantages of the present disclosure can be also newly recognized through the embodiments of the present disclosure.

BRIEF DESCRIPTION OF THE DRAWINGS

FIG. 1 is a block diagram of a power charging/selling device in accordance with an embodiment of the present disclosure.

FIG. 2 is a block diagram of an electronic control device in accordance with an embodiment of the present disclosure.

FIG. 3 is a diagram of a power charging/selling system in accordance with an embodiment of the present disclosure.

FIG. 4 is a flowchart illustrating a power charging/selling method in accordance with an embodiment of the present disclosure.

DESCRIPTION OF SPECIFIC EMBODIMENTS

Hereinafter, exemplary embodiments of the present disclosure will be described in detail with reference to the accompanying drawings so that those skilled in the art can easily practice the present disclosure. The present disclosure can be implemented in various different forms, and is not limited to the exemplary embodiments described herein.

In order to clearly illustrate the present disclosure, parts not related to the description are omitted, and like parts are denoted by similar reference numerals throughout the specification.

Throughout this specification, it will be understood that when an element is referred to as being "connected" to another element, it can be "directly connected" to the other element or "electrically connected" to the other element with other elements interposed therebetween. It will be further understood that when an element is referred to as "comprises" another element, the element is intended not to exclude other elements, but to further include other elements, unless the context clearly indicates otherwise.

When it is described that any one part is "on" the other part, it can mean that the part is directly on the other part or any other part is interposed therebetween. On the contrary, when it is described that any one part is "directly on" the other part, there is no other part interposed therebetween.

The terms "first," "second," "third" and the like are used to illustrate different parts, components, areas, layers and/or sections, but are not limited thereto. The terms are only used to differentiate a certain part, component, area, layer or section from other part, component, area, layer or section. Accordingly, a first part, component, area, layer or section, which will be mentioned hereinafter, can be referred to as a second part, component, area, layer or section without departing from the scope of the present disclosure.

The terminology used herein is for the purpose of describing particular embodiments only and is not intended to limit the present disclosure. As used herein, the singular forms are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, and/or components.

Terms "below", "above", and the like indicating a relative space can be used to more easily describe a relationship between one part illustrated in the drawings with another part. These terms are intended to include other meanings or operations of a device that is being used, in addition to meanings intended in the drawings. For example, when the device in the drawing is inverted, any parts described as being "below" other parts can be described as being "above" the other parts. Therefore, the exemplary term "below" includes both of an upper direction and a lower direction. The device can rotate by 90° or other angles, and the terms indicating a relative space are also interpreted according thereto.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be additionally interpreted as having a meaning that is consistent with their meaning in the context of the relevant art and/or the present disclosure, and will not be interpreted in an idealized or overly formal sense unless expressly so defined herein.

Hereinafter, exemplary embodiments of the present disclosure will be described in detail with reference to the accompanying drawings so that those skilled in the art can easily practice the present disclosure. However, the present disclosure can be implemented in various different forms, and is not limited to the exemplary embodiments described herein.

FIG. 1 illustrates a configuration of a power charging/selling device 100 in accordance with an embodiment of the present disclosure.

Referring to FIG. 1, the power charging/selling device 100 includes, as a device for charging power of an electric vehicle and selling the charged power of the electric vehicle, a first connection unit 110, a second connection unit 120, a control unit 130, and a guide unit 140.

The first connection unit 110 can be connected with the electric vehicle. The electric vehicle can be connected with the first connection unit 110 of the power charging/selling device 100 in order to charge power or sell the charged power. Here, the first connection unit 110 can be provided with an adapter for connecting with the electric vehicle.

The second connection unit 120 can be connected with one or more power supplier servers. Here, the second connection unit 120 can be connected with the one or more power supplier servers via a communication network. That is, the second connection unit 120 and the one or more power supplier servers can be connected to a data distribution service. The data distribution service can be connected to be mutually communicable by an Ethernet communication network, and the second connection unit 120 can be connected to the one or more power supplier servers using each different communication network, or can be connected using the same communication network.

The control unit 130 receives the unique identifier (ID) and battery information of the electric vehicle through the first connection unit 110, and receives the power-trading charge information provided from the one or more power supplier servers through the second connection unit 120. In addition, the control unit 130 can charge the electric vehicle through the first connection unit 110 with the power of the power supplier selected by the user among the one or more power suppliers or sell the power of the electric vehicle to the power supplier selected by the user through the first connection unit 110. In this time, the second connection unit 120 can be connected with a plurality of power charging/selling devices 100, and the plurality of power charging/selling devices 100 can share the power-trading charge information provided from the power supplier servers.

Specifically, the control unit 130 can receive the unique ID and battery information from the electric vehicle connected through the first connection unit 110. Here, the battery information can include at least one of the remaining amounts of the battery of the electric vehicle, the availability of charging power in the battery, the availability of selling the charged power of the battery, and the duration of the battery. The control unit 130 can be connected with the electric vehicle through the first connection unit 110 with the data distribution service, and can receive the unique ID and battery information of the electric vehicle from the data distribution service. The control unit 130 can access the network using the unique ID of the electric vehicle.

In addition, the control unit 130 can receive the power selling and/or buying charge information provided from the one or more power supplier servers through the second connection unit 120. The power supplier server can measure the selling charge and the buying charge for a certain amount of power, and each power supplier server can transmit the selling and/or buying charge information measured through the second connection unit 120 to the control unit 130. Here, the selling charge and/or the buying charge for the certain amount of power measured in the power supplier server can be variously measured for each time zone, and can be variously measured for each region. For example, the power selling and/or buying charges can be highly measured during daylight having much power uses, and the power selling and/or buying charges can be measured low at dawn having a little power use.

Here, the electric vehicle can generate the battery information as a topic of the data distribution service, and the control unit 130 can receive the battery information in connection with the topic. In addition, the power supplier server can generate the power-trading charge information as a topic of the data distribution service, and the control unit 130 can generate the power-trading charge information in connection with the topic.

The data distribution service can publish data to a number of unspecified users on the network, and the users can subscribe to the data distribution service. Publishers that publish the data for the service and the service subscribers can set up one domain, and distribute the data in the multicast manner. Accordingly, in the data distribution service, a plurality of participants in the network domain can perform efficient and rapid data distribution using the multicast. The plurality of users can be classified, depending on their role, into the publisher providing the data and the subscriber receiving the data, and the users on all the networks can perform communication only among the users having the same topic. The topic refers to the data type exchanged by the publishers and the subscribers within the domain. The electric vehicle and the power supplier server as the publisher can generate the battery information and the power-trading charge information as a topic to publish the battery information and the power trading charge information, and the control unit 130 as the subscriber can subscribe the battery information and the power-trading charge information published in the electric vehicle and the power supplier server. In addition, the control unit 130 can access the network for the data distribution service using the unique ID of the electric vehicle received in the electric vehicle through the first connection unit 110.

In addition, the control unit 130 can assign a quality-of-service (QoS) rating to the battery information of the electric vehicle received in the first connection unit 110 and the power-trading charge information received in the second connection unit 120, and receive each information based on the assigned QoS rating. For example, the control unit 130 can assign the power-trading charge information provided from the power supplier server as a high QoS rating, and can assign the battery information provided from the electric vehicle as a low QoS rating. Accordingly, the control unit 130 can rank the received information so that more important information is received first. In addition, the control unit 130 can receive the high QoS rating in several times so that the information is received more accurately.

The charges measured in the one or more power supplier servers are advertised through the guide unit 140, and the user can select one power supplier of the one or more power supplier servers. The control unit 130 can charge the electric vehicle with the power of the power supplier selected by the user or sell the power of the electric vehicle to the power supplier selected by the user. That is, the control unit 130 allows the electric vehicle to be charged with the power of the power supplier selected by the user, and the user can pay the charging charge to the selected power supplier. Here, the power supplier server can charge to the user the power charging charge that is proportional to the amount of power charged in the electric vehicle. In addition, the control unit 130 allows the power of the electric vehicle to be sold to the power supplier selected by the user, and the user can receive the selling charge from the selected power supplier. Here, the power supplier server can pay to the user the power buying charge that is proportional to the amount of power bought from the electric vehicle.

The guide unit 140 can advertise to the user the power-trading charge information received from the one or more power supplier servers. The guide unit 140 can advertise the benefit, discount information, etc. that the user can receive when selecting the power supplier in addition to the charge information from the power supplier server. The guide unit 140 can include a display unit or a voice guide device for advertising the power trading charge received from the power supplier server.

In addition, the guide unit 140 can display the battery information of the electric vehicle received through the first connection unit 110 from the control unit 130. The guide unit 140 can display at least one of the remaining amounts of the battery of the electric vehicle, the availability of charging the power of the battery or selling the charged power, and the duration of the battery. The guide unit 140 can display the battery information of the electric vehicle so that the user can determine how much the power of the electric vehicle should be charged, how much the power of the electric vehicle can be sold, etc.

FIG. 2 illustrates a configuration of an electronic control device 200 in accordance with an embodiment of the present disclosure.

Referring to FIG. 2, the electronic control unit 200 includes a connection unit 210, a sensor unit 220, and a control unit 230. The electronic control unit 200 can be provided in the electric vehicle, and can control the battery of the electric vehicle by interlocking with the power charging/selling device 100.

The connection unit 210 can be connected with the power charging/selling device 100. The connection unit 210 can be connected with the first connection unit 110 of the power charging/selling device, and the connection unit 210 can include an adapter for connecting with the first connection unit 110.

The sensor unit 220 can measure the state of the battery. When the connection unit 210 is connected with the power charging/selling device 100, the sensor unit 220 can measure the state of the battery to deliver it to the control unit 130. Here, the state of the battery can be the remaining amounts of the battery, the availability of charging or selling the power of the battery, the duration of the battery, etc.

The control unit 230 can generate the state information of the battery based on the measurement signals related to the state of the battery delivered from the sensor unit 220, control the power discharging of the battery for charging and/or selling the power of the battery, and transmit/receive a control signal by interlocking with the power charging/selling device through the connection unit 210. The control unit 230 can generate the state information of the battery based on the measurement signals related to the state of the battery delivered from the sensor unit 220 to deliver it to the connection unit 210. The connection unit 210 can deliver the state information of the battery delivered from the control unit 230 to the power charging/selling device 100, and the power charging/selling device 100 can display the state information of the battery delivered from the control unit 230 on the display so that the user confirms the remaining amounts of the battery of the electric vehicle, the availability of charging or selling the power of the battery, the duration of the battery, etc.

FIG. 3 illustrates a configuration of a power charging/selling system in accordance with an embodiment of the present disclosure.

Referring to FIG. 3, a power charging/selling system in accordance with an embodiment of the present disclosure can include the power charging/selling device 100, the electronic control device 200, and a power supplier server 300.

The electronic control device 200 can transmit the unique ID and battery information of the electric vehicle to the power charging/selling device 100. When the electronic control device 200 is connected with the power charging/selling device 100, it can transmit the unique ID and battery information of the electric vehicle to the power charging/selling device 100. Here, the electronic control unit 200 can transmit the battery information such as the remaining amounts of the battery, the availability of charging the power of the battery or selling the charged power, and the duration of the battery to the power charging/selling device 100 through the data distribution service.

In addition, the power supplier server 300 can transmit the power-trading charge information of the electric vehicle to the power charging/selling device 100. Here, the power supplier server 300 can be plural, and the power charging/selling device 100 can receive the power-trading charge information from each of the plurality of power supplier servers 300. The power supplier server 300 can periodically transmit the power-trading charge information to the power charging/selling device 100. The power supplier server 300 can measure the charge for a certain amount of the charged power to transmit it to the power charging/selling device 100, and the power supplier server 300 can measure the charge for a certain amount of the sold power to transmit it to the power charging/selling device 100. Here, the plurality of power supplier servers 300 can be connected with the power charging/selling device 100 with the data distribution service to transmit the charge information from each of the power supplier servers 300 to the power charging/selling device 100.

The power charging/selling device 100 can access the network for the power charging/selling system through the unique ID of the electric vehicle delivered from the electronic control unit 200. The power charging/selling device 100 can access the network to drive the system for charging the power in the electric vehicle or selling the charged power.

In addition, the power charging/selling device 100 can display the battery information of the electric vehicle delivered from the electronic control unit 200 on the display so that the user can recognize it. The user can look at the battery information displayed on the display and determine the amount of power to be charged in the electric vehicle or the amount of the charged power to be sold.

The power charging/selling device 100 can advertise to the user the power-trading charge information delivered from the power supplier server 300. The power charging/selling device 100 can advertise the power-trading charge information received from the power supplier server 300 and the benefits, the discount information, etc. that can be obtained when selecting the corresponding power supplier. The user can select one power supplier by comparing the charge information, the benefits, etc. provided by the plurality of power supplier servers 300 advertised from the power charging/selling device 100.

The power charging/selling device 100 can charge the electric vehicle with the power supplied from the power supplier selected by the user, or sell the power of the electric vehicle to the power supplier selected by the user. The power charging/selling device 100 can charge the electric vehicle with the power of the power supplier selected by the user, and the power supplier can charge the charge to the user depending upon the amount of power charging the electric vehicle. In addition, the power charging/selling device 100 can sell the power of the electric vehicle to the power supplier selected by the user, and pay the charge to the user depending upon the amount of power sold to the power supplier. Here, the user can pay the charge to the power supplier through the power charging/selling device 100 when charging power of the electric vehicle. That is, the power charging/selling device 100 can include a payment device in order to pay the charging charge in cash or by card.

FIG. 4 illustrates a power charging/selling method in accordance with an embodiment of the present disclosure.

Referring to FIG. 4, the power charging/selling device 100 is connected with the electronic control unit 200, and can receive the unique ID and battery information of the electric vehicle from the electronic control unit 200 S11. The electronic control unit 200 can generate the battery information as a topic of the data distribution service, and the power charging/selling device 100 can receive the battery information in connection with the topic. In this time, the power charging/selling device 100 can access the network for the data distribution service with the unique ID of the electric vehicle received from the electronic control unit 200.

Then, the power charging/selling device 100 can receive the power-trading charge information from the power supplier server 300 S12. The power supplier server 300 can generate the charge information depending upon a certain amount of power for the charged power of the electric vehicle to transmit it to the power charging/selling device 100. In addition, the power supplier server 300 can generate the charge information depending upon a certain amount of power for selling the charged power of the electric vehicle to transmit it to the power charging/selling device 100. Here, the power supplier server 300 can periodically transmit the power-trading charge information to the power charging/selling device 100, and the power charging/selling device 100 can periodically receive the power-trading charge information provided from each power supplier. The power supplier server 300 can generate the power-trading charge information as a topic of the data distribution service, and the power charging/selling device 100 can receive the power-trading charge information in connection with the topic.

The power charging/selling device 100 advertises the power-trading charge information provided from the power supplier server 300 S13. The power charging/selling device 100 can advertise to the user the power-trading charge information provided from the power supplier server 300. The user can select one power supplier of the plurality of power suppliers through the advertisement provided from the power charging/selling device 100.

The power charging/selling device 100 charges the electric vehicle with the power of the power supplier selected by the user or sells the power of the electric vehicle to the power supplier selected by the user S14. The power charging/selling device 100 can charge the electric vehicle using the power of the power supplier selected by the user. In this time, the power supplier server 300 can charge to the user the charging charge depending upon the amount of power charging the electric vehicle. In addition, the power charging/selling device 100 can sell the charged power of the electric vehicle to the power supplier selected by the user. In this time, the power supplier server 300 can pay to the user the selling charge depending upon the amount of power bought from the electric vehicle.

As described above, the present disclosure can achieve the power charging/selling system and method of the electric vehicle, which advertises the power charge information provided from the plurality of power suppliers providing power when the electric vehicle and the charging station are connected, and charges the charging charge to the electric vehicle by the selected power supplier.

Those skilled in the art to which the present disclosure pertains will understand that the present disclosure can be implemented in other various forms without departing from the technical spirit or essential characteristics of the present disclosure, so the aforementioned embodiments should not be construed as being limitative. The scope of the present disclosure is disclosed in the following claims rather than the detailed description, and it should be understood that all modifications or variations derived from the meanings and scope of the appended claims and equivalents thereof.

What is claimed is:

1. A device for charging an electric vehicle with power and for selling power stored in a battery of the electric vehicle, the device comprising:
    a first connection unit configured to be connected to the electric vehicle;
    a second connection unit configured to be connected to a plurality of power supplier servers via a charging station;
    a control unit for receiving a unique identifier and battery information of the electric vehicle through the first connection unit and for receiving power-trading charge information provided from each of the plurality of power supplier servers through the second connection unit when the second connection unit is connected to the charging station; and
    display unit for displaying the power-trading charge information according to the plurality of power supplier servers, respectively, and for enabling comparison of the displayed power-trading charge information and selection of a power supplier corresponding to one of the plurality of power supplier servers, the display unit further displaying the battery information, the displayed battery information including at least one of an availability of charging the power of the battery and an availability of selling the charged power,
    wherein the control unit is configured to
        charge, through the first connection unit, the battery of the electric vehicle with the power of a selected power supplier, and
        sell, through the first connection unit, the power stored in the battery of the electric vehicle to a selected power supplier.

2. The device of claim 1, wherein the displayed battery information further includes a remaining amount of the battery of the electric vehicle and a duration of the battery of the electric vehicle.

3. The device of claim 1, wherein the control unit is further configured to acquire the power trading charge information from a topic of a data distribution service having the power trading charge information generated and delivered by the plurality of power supplier servers.

4. The device of claim 1, wherein the control unit is further configured to acquire the battery information from a topic of a data distribution service having the battery information generated and delivered by the electric vehicle.

5. The device of claim 1, wherein the control unit is further configured to access a network for a data distribution service, using the received unique identifier.

6. The device of claim 1, wherein the control unit is further configured to assign a quality-of-service (QoS) rating to information received through the first connection unit and through the second connection unit, respectively, and to receive the information based on the respectively assigned QoS rating.

7. A system for charging an electric vehicle connected to a charging station with power and for selling power stored in a battery of the electric vehicle, wherein the charging station is connected to a plurality of power supplier servers each configured to transmit power-trading charge information to the power charging and selling device, the transmitted power-trading charge information including information respectively corresponding to each of the plurality of power supplier servers, the system comprising:
    a power charging and selling device;
    an electronic control device for interlocking with the power charging and selling device and for managing the battery of the electric vehicle, the electronic control device configured to transmit a unique identifier and battery information of the electric vehicle to the power charging and selling device; and
    wherein the power charging and selling device is configured to
        display the power-trading charge information according to the plurality of power supplier servers, respectively, in order to enable comparison of the displayed power-trading charge information and selection of a power supplier corresponding to one of the plurality of power supplier servers, display the battery information, the displayed battery information including at least one of an availability of charging the power of the battery and an availability of selling the charged power, charge the battery of the electric vehicle with the power of a selected power supplier, and sell the power stored in the battery of the electric vehicle to a selected power supplier.

8. The system of claim 7, wherein each of the plurality of power supplier servers is further configured to generate the power-trading charge information as a topic of a data distribution service and to receive the power-trading charge information in connection with the topic.

9. The system of claim 7, wherein the electronic control device is further configured to generate the battery information as a topic of a data distribution service and to receive the battery information in connection with the topic.

10. The system of claim 9, wherein the power charging and selling device is further configured to access the topic, using the transmitted unique identifier.

11. The system of claim 7, wherein the power charging and selling device is further configured to assign a quality-of-service (QoS) rating to information received from the electronic control device and from each of the plurality of power supplier servers, respectively, and to receive the information based on the respectively assigned QoS rating.

12. A method of using a power charging and selling device to charge a battery of an electric vehicle connected to a charging station with power and to sell power stored in the battery of the electric vehicle, the method comprising:

connecting an electronic control device provided in the electric vehicle to the power charging and selling device, to receive a unique identifier and battery information of the electric vehicle from the electronic control device;

receiving power-trading charge information from each of a plurality of power supplier servers via the charging station;

displaying the power-trading charge information according to the plurality of power supplier servers, respectively, in order to enable comparison of the displayed power-trading charge information and selection of a power supplier corresponding to one of the plurality of power supplier servers;

displaying the battery information, the displayed battery information including at least one of an availability of charging the power of the battery and an availability of selling the charged power;

performing one of charging the battery of the electric vehicle with the power of a selected power supplier, and selling the power stored in the battery of the electric vehicle to a selected power supplier.

13. The method of claim 12, wherein, in the receiving the unique identifier and battery information of the electric vehicle from the electronic control device, the electronic control device generates the battery information as a topic of a data distribution service and receives the battery information in connection with the topic.

14. The method of claim 12, wherein, in the receiving the unique identifier and battery information of the electric vehicle from the electronic control device, the power charging and selling device accesses a network for a data distribution service, using the received unique identifier.

15. The method of claim 12, wherein, in the receiving the power-trading charge information, each of the plurality of power supplier servers generates the power-trading charge information as a topic of a data distribution service and receives the power-trading charge information in connection with the topic.

* * * * *